(12) United States Patent
Haldar

(10) Patent No.: US 11,121,876 B2
(45) Date of Patent: Sep. 14, 2021

(54) DISTRIBUTED ACCESS CONTROL

(71) Applicant: Microsoft Technology Licensing, LLC, Redmond, WA (US)

(72) Inventor: Abhijeet Haldar, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 268 days.

(21) Appl. No.: 15/950,745

(22) Filed: Apr. 11, 2018

(65) Prior Publication Data

US 2019/0319794 A1 Oct. 17, 2019

(51) Int. Cl.
*G06F 21/30* (2013.01)
*H04L 29/06* (2006.01)
*H04L 9/32* (2006.01)
*G06F 21/62* (2013.01)
*H04L 9/08* (2006.01)
*H04L 29/08* (2006.01)

(52) U.S. Cl.
CPC .......... *H04L 9/3228* (2013.01); *G06F 21/62* (2013.01); *H04L 9/0825* (2013.01); *H04L 9/3213* (2013.01); *H04L 9/3247* (2013.01); *H04L 63/10* (2013.01); *H04L 63/12* (2013.01); *H04L 63/0428* (2013.01); *H04L 67/10* (2013.01)

(58) Field of Classification Search
CPC .......... H04L 63/04; H04L 63/08; G06F 21/30
See application file for complete search history.

(56) References Cited

U.S. PATENT DOCUMENTS

| | | | |
|---|---|---|---|
| 2017/0331887 A1* | 11/2017 | Fishler | H04L 67/1087 |
| 2018/0006826 A1 | 1/2018 | Smith et al. | |
| 2018/0212772 A1* | 7/2018 | Leavy | H04L 9/0863 |
| 2019/0289013 A1* | 9/2019 | Makmel | H04L 63/0861 |
| 2020/0129694 A1* | 4/2020 | Tang | G16H 50/20 |

FOREIGN PATENT DOCUMENTS

| | | |
|---|---|---|
| WO | 2017079795 A1 | 5/2017 |
| WO | 2017127564 A1 | 7/2017 |
| WO | WO-2019171270 A1 * | 9/2019 ........... H04L 9/3255 |

OTHER PUBLICATIONS

"International Search Report and Written Opinion Issued in PCT Application No. PCT/US2019/025684", dated May 23, 2019, 12 Pages.

* cited by examiner

*Primary Examiner* — Izunna Okeke
(74) *Attorney, Agent, or Firm* — Dicke, Billig & Czaja, PLLC

(57) ABSTRACT

A distributed access control system is disclosed. A payload is received at a voted principal from the client. The voted principal is selected from the plurality of minors. The payload is passed to the minors, and the user is verified by a consensus of the minors. A response packet, which includes an authentication unit, is prepared via a consensus of minors. The response packet can be provided to the client via the voted principal. The ledger is updated to include the authentication unit.

19 Claims, 2 Drawing Sheets

DISTRIBUTED ACCESS CONTROL

BACKGROUND

An aspect of computer security involves protecting against unauthorized access to secure computer networks. Access control systems control which users can access resources in the operating system. Applications can call access control functions to set which users can access specific resources or control access to resources provided by the application. Access control systems can incorporate features of identity management systems, and vice versa. A number of authentication protocols are available to allow computer network nodes communicating over a non-secure network, such as the internet, to demonstrate their identity to one another and provide access. In one example, the system authenticates a user's account name and password when the user logs on. If the logon is successful, the access control system can create an access token. Processes executed on behalf of the user will have a copy of this access token. The access token contains security identifiers that identify the user's account and any group accounts to which the user belongs. The token can include a list of the privileges held by the user or the user's groups. The system can apply this token to identify the associated user when a process tries to access a securable object or perform a system administration task that includes privileges.

SUMMARY

This summary is provided to introduce a selection of concepts in a simplified form that are further described below in the Description. This summary is not intended to identify key features or essential features of the claimed subject matter, nor is it intended to be used to limit the scope of the claimed subject matter.

Typical access control systems include a central management system even if that system is spread over multiple tiers or in a cluster on a computer network. Such centralized features are vulnerable to manipulation and attack vectors. In the illustrated examples, a distributed access control system is configured in a distributed architecture of networked minors in a peer-to-peer network such as a blockchain. The distributed access control system includes a distributed ledger on the minors to include authentication units, and the distributed access control system includes a consensus system, such as a polling mechanism.

The distributed access control system includes a method, which, in one example, can be implemented as computer readable medium to store computer readable instructions. A payload is received at a voted principal from the client. The payload can include user objects. The voted principal is selected from the plurality of minors. The minors process a ledger including user data and authentication units such as security token information including time to live data. The payload is passed to the minors, and the user is verified by a consensus of the minors. A response packet, which includes an authentication unit, is prepared via a consensus of minors. The response packet can be provided to the client via the voted principal. The ledger is updated to include the authentication unit.

BRIEF DESCRIPTION OF THE DRAWINGS

The accompanying drawings are included to provide a further understanding of embodiments and are incorporated in and constitute a part of this disclosure. The drawings illustrate embodiments and together with the description serve to explain principles of embodiments. Other embodiments and many of the intended advantages of embodiments will be readily appreciated, as they become better understood by reference to the following description. The elements of the drawings are not necessarily to scale relative to each other. Like reference numerals designate corresponding similar parts.

DESCRIPTION

In the following Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense. It is to be understood that features of the various example embodiments described herein may be combined, in part or whole, with each other, unless specifically noted otherwise.

Figure 1:
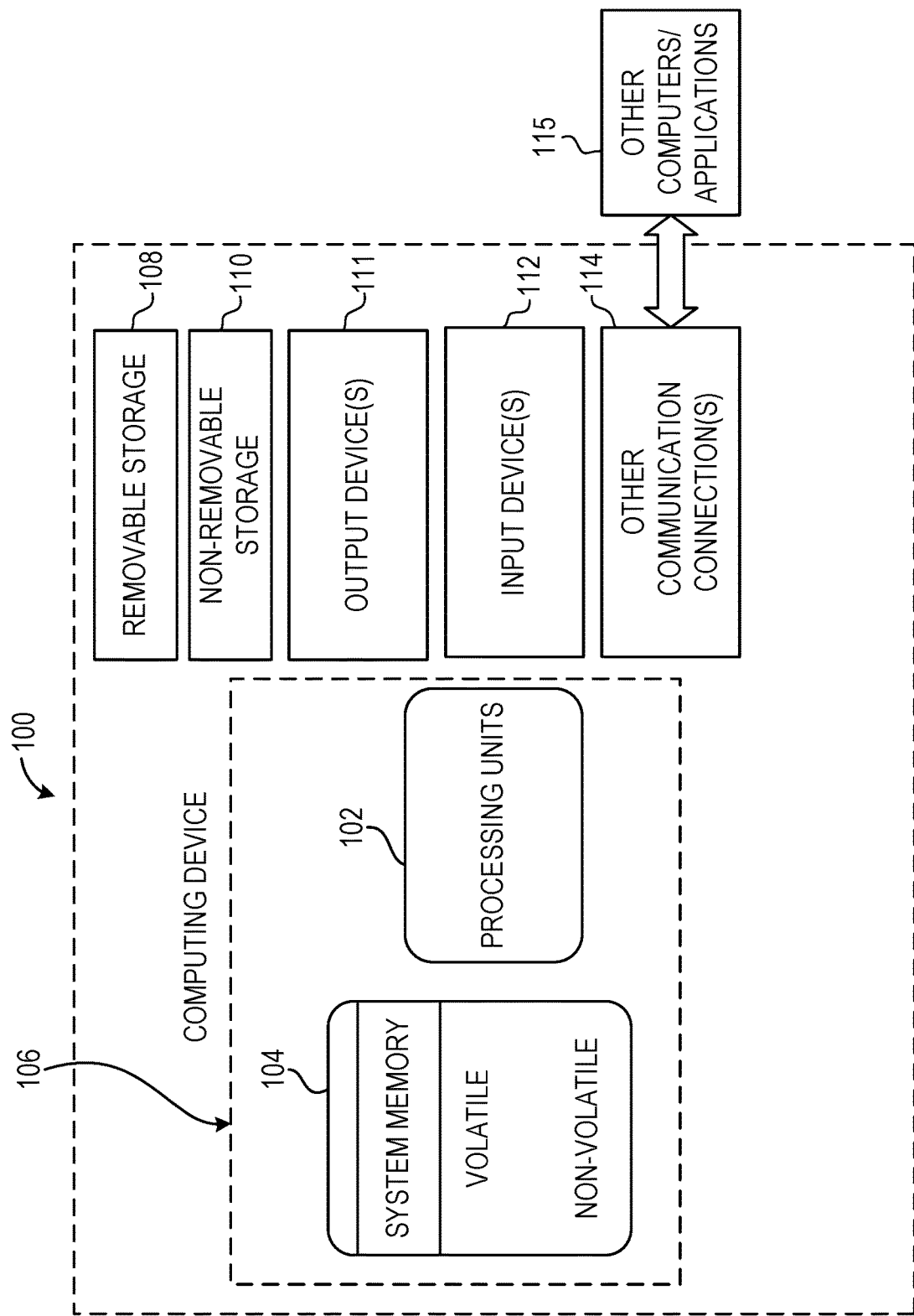
FIG. 1 is a block diagram illustrating an example of a computing device, which can be configured in a computer network.

FIG. 1 illustrates an exemplary computer system that can be employed in an operating environment and used to host or run a computer application included on one or more computer readable storage mediums storing computer executable instructions for controlling the computer system, such as a computing device, to perform a process.

The exemplary computer system includes a computing device, such as computing device 100. The computing device 100 can take one or more of several forms. Such forms include a tablet, a personal computer, a workstation, a server, a handheld device, a consumer electronic device (such as a video game console or a digital video recorder), or other, and can be configured as part of a computer network.

In a basic hardware configuration, computing device 100 typically includes a processor system having one or more processing units, i.e., processors 102, and memory 104. By way of example, the processing units may include two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), nonvolatile (such as read only memory (ROM), flash memory, etc.), or some combination of the two.

Computing device 100 can also have additional features or functionality. For example, computing device 100 may also include additional storage. Such storage may be removable or non-removable and can include magnetic or optical disks, solid-state memory, or flash storage devices such as removable storage 108 and non-removable storage 110.

Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Accordingly, a propagating signal by itself does not qualify as storage media. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse, track pad), stylus, voice input device, touch input device (e.g., touchscreen), or other. Output devices 111 may include devices such as a display, speakers, printer, or the like.

Computing device 100 often includes one or more communication connections 114 that allow computing device 100 to communicate with other computers/applications 115. Example communication connections can include an Ethernet interface, a wireless interface, a bus interface, a storage area network interface, and a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, or other network.

In one example, an access control system can provide one or more of access features, authentication features, or identity management features in a domain. A typical domain is a form of a computer network in which all user accounts, computers, printers and other security principals, are registered with a database located on one or more clusters of computers known as domain controllers. Authentication takes place on the domain controllers. In one example, each user within a domain receives a unique user account that can then be assigned access to resources within the domain. A domain network can make use of a directory service. A directory service or name service maps the names of network resources to respective network addresses. The directory service is a shared information infrastructure for locating, managing, administering and organizing everyday items and network resources, which can include volumes, folders, files, printers, users, groups, devices, telephone numbers and other objects. The directory service can consider each resource on the network an object. Information about a particular resource is stored as a collection of attributes associated with that resource or object. One example of a directory service is available under the trade designation Active Directory Domain Service from Microsoft, Corporation. An example directory service can authorize all users and computers in a domain type network, which can include assigning and enforcing security policies for all computers and installing or updating software. For example, when a user logs into a computer that is part of the domain, the directory service checks the submitted authentication information, such as password, and determines whether the user is a system administrator or normal user. Also, it allows management and storage of information, provides authentication and authorization mechanisms, and establishes a framework to deploy other related services: Certificate Services, Federated Services, Lightweight Directory Services and Rights Management Services. A directory service can use a version of the authentication or access protocol. Access control systems can be applied to other sets of resources or network types.

Typical access control systems, however, include a central management system even if that system is spread over multiple tiers or in a cluster on a computer network. Such centralized features are vulnerable to manipulation and attack vectors.

Figure 2:
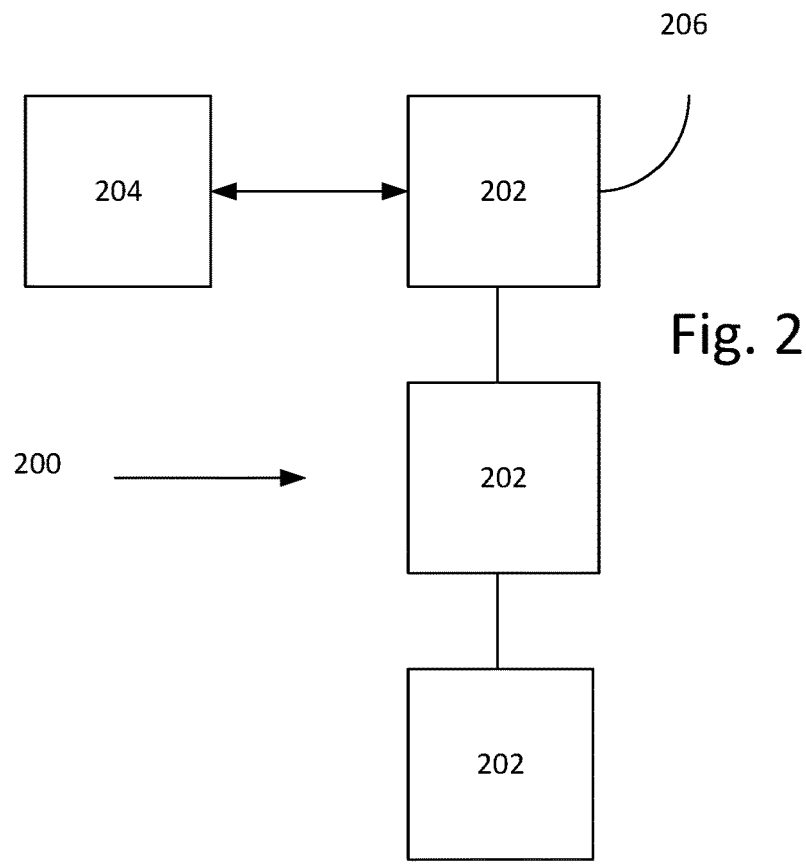
FIG. 2 is a schematic diagram illustrating an example a computer network configured as a domain including the example computing device of FIG. 1.

FIG. 2 illustrates an example distributed access control system 200. Distributed access control system 200 includes a plurality of loosely coupled computing nodes called minors 202. Each minor 202 can include a computing device having a processor and memory, and may be configured from a network of processor cores, computing devices, servers, virtual machines, or other processing systems. The access control system 200 can be included in a network, which in one example is a domain, the network including various computing resources including servers and printers, and may include objects such as files, volumes, other users, and additional security features or services. The minors can include a ledger of user data or information regarding user with access permissions to the resources and other information. The illustrated example includes a client 204 attempting to access resources within the network via the distributed access control system 200. In the example, the client 204 interfaces with a principal 206, which is a selected minor of the plurality of minors 202. The client 204 and the principal 206 can communicate via a communication channel on the network such that the client 204 and principal 206 can pass and receive objects between them.

The distributed access control system 200 is configured in a distributed architecture of networked minors 202 that can communicate, in one example, by passing messages. One example of a distributed architecture in which the networked minors 202 are configured includes a peer-to-peer type network, which is in contrast to a traditional client-server model. For example, the distributed access control system 200 is configured as a distributed application architecture that partitions tasks and workloads between minor 202 peers. The example distributed access control system 200 includes a distributed ledger with access information including user data and authentication units, and also includes a consensus system, such as a voting system or polling mechanism in the peer-to-peer network. The distributed ledger can be configured as a blockchain is one example. The distributed ledger may be implemented as a private platform or based on a platform available in a public cloud. In one example, the distributed access control system 200 is configurable on a blockchain-as-a-service platform available from a cloud service provider such as under the trade designation Azure from Microsoft Corporation of Redmond, Wash., or a ledger fabric infrastructure. The minors 202 can be implemented on processors, virtual machines, containers, or other nodes within the platform.

The distributed ledger in the distributed access control system 200 can include information regarding users of the domain, respective permissions, access information such as access time, security tokens and other information that might otherwise be stored in a central authority. The ledger can be included with all the minors 202 in the distributed access control system 200 such that each minor includes the information regarding the ledger. If a minor 202 is unable to perform or process information or is removed from the system 200, other minors 202 can continue the features of the distributed access control system 200 and other minors can be added to the system 200 to include the ledger. In one example, the distributed control system 200 is configured as a distributed application on the minors 202 in a peer-to-peer architecture. In one example, the distributed application is a decentralized application, which is an unstoppable distributed application in the peer-to-peer architecture.

Figure 3:
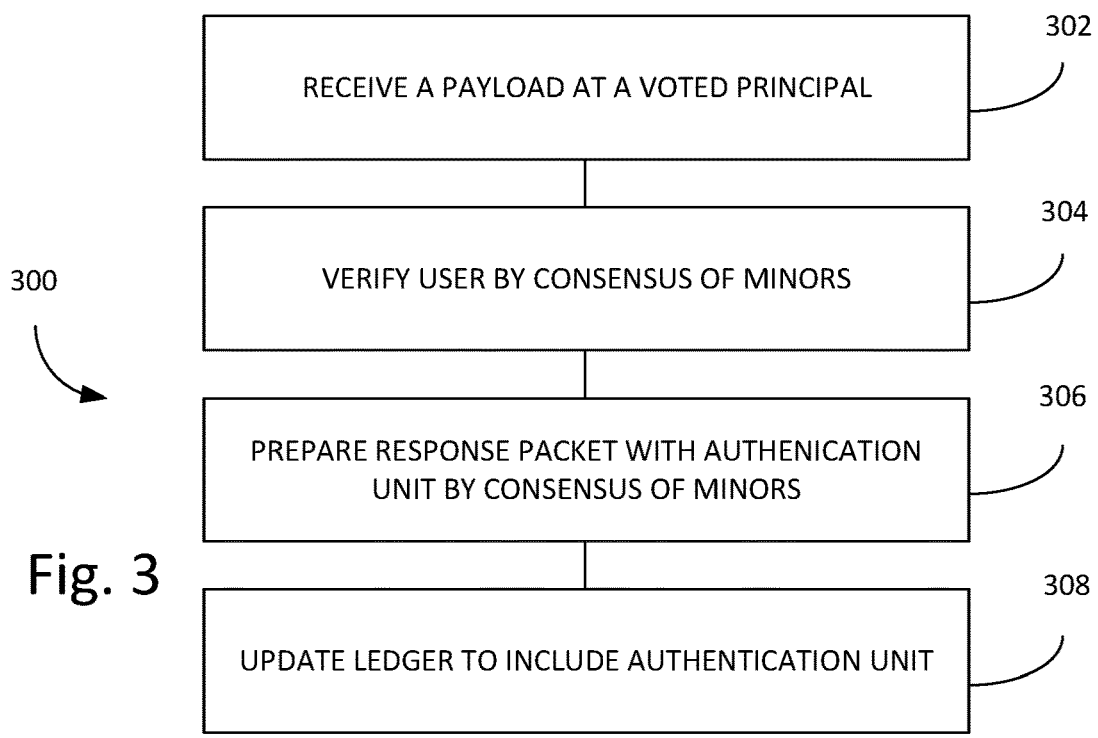
FIG. 3 is a block diagram illustrating an example method of authentication protocol for use with the example computer network of FIG. 2.

FIG. 3 illustrates an example of method 300 implemented in the distributed access control system 200. The method 300 is executed in a ledger pattern having a polling mechanism to validate and securely identify user objects provided by a user or client 204. In the example method 300, a payload is received at a voted principal 206 from the client 204 at 302. The payload can include user objects. The voted principal 206 is selected from the plurality of minors 202, which process a ledger. The payload is passed to the minors 202, and the user is verified by a consensus of the minors 202 at 304. The user can be verified against user data in a distributed ledger on the minors. If verified, for example, a response packet can be prepared. The response packet, which includes an authentication unit, is prepared via a consensus of minors 202 at 306. The response packet can be provided to the client 204 via the voted principal. The authentication unit can be applied to access resources, for example, in a domain of the distributed access control system 200. The ledger is updated to include the authentication unit at 308. The update in the ledger can include information on the authentication unit, such as time to live information.

In one example, the method 300 for the distributed access control system 200 is based on public key private key digital signature with a client's private key. The distributed control system 200 is based on a plurality of minors in a distributed ledger management system that can implement the method via smart contracts and a validation system to perform the verifications. The client 204 uses a private key to encrypt a user name or user email, for example or other personal information, and the original timestamp and digitally signs the payload using the private key. The payload is transmitted to the network of minors 202 via the principal 206 at 302 to start deciphering the payload by mapping it to the public keys to identify the client 204. The email/username hash at the ledger is matched against the provided hash of email/username by the client in the payload. Once verified at 304, a user token is generated by the minors. The first minor of the minors 202 to generate the user token notifies all the other minors 202 in the processing circle to stop the hashing process. The token along with hash of username and timestamp is transmitted back to the client with the response packet at 306. The client 204 matches the hash with original to authenticate the integrity of the response and uses the token to retrieve user object and permission details from the distributed access control system 200.

The payload is received at a voted principal from the client 204 at 302. In one example, the client 204 holds a key, such as a public key, that could be created by client 204 or generated by the system 200. In the example, the client 204 passes the key to validate them and does not pass the username, e-mail, or other personal information that the minors 202 access from the distributed ledger information. The payload could also include an original timestamp. A pass key could be employed to digitally sign the timestamp and other meta data. The public key could encrypt the digitally sign the payload with a receiver identifier. In this example, the system employs an RSA encryption, but other systems could be used with the distributed control system 200. In one example, the payload is an encrypted packet digitally signed using a private key and includes a hash of the username and timestamp as originally generated, or not hashed.

The minors 202 can select a principal 206 to interface with the client 204. In one example, the principal 206 is selected based on processing volume, such as the least dense minor. In one example, if several clients are attempting to access the distributed control system 200, more than one minor may be selected as principal. Different minors may interfaces with different clients or different clients may interface the one minor. In one example, the principal can perform features of method 300 that are not subjected to consensus polling.

The payload is passed to the minors 202, and the user is verified by a consensus of the minors 202 at 304. For example, the consensus could be a threshold percentage or amount of minors 202 that verify the user or client 204. If at least a threshold percentage or amount of minors 202 verify the user or client 204, the method 300 proceeds. If not, the verification fails and access is denied. For example, the client 204 is verified by mapping the public key to the digitally signed packed. If the verification fails, and the minors stop processing and a notification can be sent to the client 204 via the principal 206. If the client is verified, the minors can extract the timestamp from the payload and user data that is stored in the distributed ledger. In the illustrated example, the minors 202 receive the public key and try to decrypt the encrypted user objects in the payload. The minors 202 apply the key and attempt to decrypt the user object that includes and key to decrypt the timestamp.

A response packet, which includes an authentication unit, is prepared via a consensus of minors 202 at 306. In an example of creating a response packet at 306, a hash is created from the user objects in the payload and data within the ledger, such as a hash of the timestamp from the payload, username from the ledger, and the key from the payload. Instead of the username, the hash can include other information that resides with the client 204 and is included in the ledger but that is not passed between the client 204 and the principal 206 during method 300. The hash is sent to the minors 202 to determine whether there is a match between the minors of the hash. The minors 202 process the hash to determine if there is a match. If a match is found in at least a threshold percentage or amount of minors 202, the method 300 proceeds. If not, the access fails, and the client can be notified and the remaining processing minors stop processing. The threshold percentage or amount for determining whether a hash is matched can be the same or different than the threshold percentage or amount for determining the user at 304. If the match is at least the threshold percentage or amount of minors, the distributed access control system 200 can create a security token with a lifespan, such as a time to live. The time to live for the security token can be stored with the minors 202 in the distributed ledger system. The security token is encrypted, and the principal 206 can send the encrypted security token to the client for use in accessing resources of the network or domain. In the example, the security token can be decrypted via the timestamp, key, and username. If the client is able to decrypt the token, the token can be used to access resources prior to expiration of the token or else client access to the The ledger is updated to include the authentication unit at 308. The authentication unit in this example includes information regarding the access credentials passed to the client 204. For example, the authentication unit can include the username, the security token, and the expiration of the security token along with any updated privileges or related information of relevance. Once the security token expires, the minors 202 can indicate the token has expired in the ledger.

Distributed access control system 200 using a distributed ledger provides that updates to the user profile is unidirectional and is not altered in historic recordings. The distributed access control system 200 can be implemented in-within private or public deployment. Public deployment would provide for global unique identity of each client in the network and further the identity can be used in shared mode with different institutions and organizations using public key association and trust protocol. Each institution or organization can include an associative sub-ledger or extension to add further details of the client. This would provide that the user identity is not duplicated or manipulated by holding of any centralized architecture and is protected against data corruption. Multiple ledgers could be maintained to cohesively build the system. Transactions could be of user identity, authentication and authorization, user token bank, extension of identity, policy and nodes in the network.

The example method 300 for controlling access or managing identify can be implemented in a domain or network having the distributed access control system 200 and includes a combination of one or more hardware devices and computer programs for controlling a system, such as a computing system having a processor and memory, to perform method 300 in system 200. For example, the method 300 can be implemented as a computer readable medium or computer readable device, such as memory 104 or storage 108, 110 having set of executable instructions for controlling the processor 102 to perform the method 300. The method 300 for controlling access can be included as a service in a cloud environment such as a software as a service, blockchain as a service, platform as a service, or infrastructure as a service as part of a feature of the service and implemented on a computing device 100 in a datacenter. For example, a domain, such as domain 200 can subscribe to a service providing method 300 to detect and control access.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A method of distributing access control in a distributed ledger, the method comprising:
receiving a payload at a voted principal of a plurality of networked minors, the principal including a selected minor determined by the plurality of minors;
verifying a user from the payload via a consensus of the minors, the minors including a ledger of user data, the payload verified against the distributed ledger of user data, the payload does not include user information included in the distributed ledger;
preparing a response packet having an authentication unit via the minors, wherein the minors generate a response token for the response packet and a first minor of the plurality of minors to generate the response token notifies other minors of the plurality of minors to stop generating the response token, the response packet provided via the principal; and
updating the distributed ledger to include the authentication unit.

2. The method of claim 1 wherein the payload includes an encrypted packet digitally signed using a private key and further includes a hash of the username and timestamp.

3. The method of claim 1 wherein the payload is received from a client.

4. The method of claim 3 wherein the principal interfaces with the client.

5. The method of claim 1 wherein the consensus of the minors includes at least a threshold percentage of the minors.

6. The method of claim 1 wherein the authentication unit includes a security token having an associated time to live.

7. The method of claim 6 wherein the security token provides access to a domain during the time to live.

8. The method of claim 1 wherein the distributed ledger is included on the minors.

9. The method of claim 1 wherein the response packet is verified by a consensus of the minors.

10. A computer readable storage device, which is not a propagating signal, to store computer executable instructions to control a processor to:
receive a payload at a voted principal of a plurality of networked minors, the principal including a selected minor determined by the plurality of minors;
verify a user from the payload via a consensus of the plurality of minors, the minors including a distributed ledger of user data, the payload verified against the ledger of user data, the payload does not include user information included in the distributed ledger;
prepare a response packet having an authentication unit via the networked minors, wherein the minors generate a response token for the response packet and a first minor of the plurality of minors to generate the response token notifies other minors of the plurality of minors to stop generating the response token, the response packet provided via the principal; and
update a distributed ledger to include the authentication unit.

11. The computer readable storage device of claim 10 wherein the payload includes user objects and is received from a client.

12. The computer readable storage device of claim 10 wherein access is denied if the user is not verified via the consensus of minors.

13. The computer readable storage device of claim 10 wherein the response packet is prepared by a consensus of minors.

14. The computer readable storage device of claim 10 wherein the response packet includes an encrypted security token.

15. A system, comprising:
a memory device to store a set of instructions; and
a processor to execute the set of instructions to:
receive a payload at a voted principal of a plurality of networked minors, the principal including a selected minor determined by the plurality of minors;
verify a user from the payload via a consensus of the plurality of minors, the minors including a distributed ledger of user data, the payload verified against the ledger of user data, the payload does not include user information included in the distributed ledger;

prepare a response packet having an authentication unit via the networked minors, wherein the minors generate a response token for the response packet and a first minor of the plurality of minors to generate the response token notifies other minors of the plurality of minors to stop generating the response token, the response packet provided via the principal; and update the distributed ledger to include the authentication unit.

16. The system of claim 15 wherein the networked minors include the distributed ledger.

17. The system of claim 16 wherein the distributed ledger is a blockchain on the networked minors.

18. The system of claim 17 wherein the blockchain is implemented on a blockchain as a service cloud service.

19. The system of claim 15 wherein the networked minors include the voted principal.

\* \* \* \* \*